US010587979B2

(12) United States Patent
Wardle

(10) Patent No.: US 10,587,979 B2
(45) Date of Patent: Mar. 10, 2020

(54) LOCALIZATION OF SOUND IN A SPEAKER SYSTEM

(71) Applicant: Sony Interactive Entertainment Inc., Tokyo (JP)

(72) Inventor: Scott Wardle, Foster City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/889,969

(22) Filed: Feb. 6, 2018

(65) Prior Publication Data

US 2019/0246229 A1 Aug. 8, 2019

(51) Int. Cl.

| | |
|---|---|
| ***H04S 7/00*** | (2006.01) |
| ***H04R 5/02*** | (2006.01) |
| ***H04R 5/027*** | (2006.01) |
| ***H04S 3/00*** | (2006.01) |
| ***G06K 9/00*** | (2006.01) |
| ***H04R 5/04*** | (2006.01) |

(52) U.S. Cl.

CPC .......... *H04S 7/303* (2013.01); *G06K 9/00624* (2013.01); *H04R 5/02* (2013.01); *H04R 5/027* (2013.01); *H04R 5/04* (2013.01); *H04S 3/008* (2013.01); *H04S 2400/01* (2013.01); *H04S 2420/01* (2013.01)

(58) Field of Classification Search

CPC ...... H04S 7/303; H04S 3/008; H04S 2400/01; H04S 2420/01; G06K 9/00624; H04R 5/02; H04R 5/027; H04R 5/04

USPC ....................................... 381/56, 58, 66, 303

See application file for complete search history.

(56) References Cited

U.S. PATENT DOCUMENTS

| | | | | |
|---|---|---|---|---|
| 8,880,395 | B2 | 11/2014 | Yoo et al. | |
| 8,886,526 | B2 | 11/2014 | Yoo et al. | |
| 9,099,096 | B2 | 8/2015 | Yoo et al. | |
| 2013/0294611 | A1 | 11/2013 | Yoo et al. | |
| 2015/0016642 | A1* | 1/2015 | Walsh | H04S 7/301 381/307 |
| 2015/0104050 | A1* | 4/2015 | Harrison | H04S 7/301 381/303 |
| 2016/0007565 | A1* | 1/2016 | Trottier | A01K 5/02 119/51.02 |
| 2017/0026769 | A1* | 1/2017 | Patel | H04R 3/12 |
| 2017/0201847 | A1* | 7/2017 | Fujita | G01C 3/06 |
| 2017/0205886 | A1* | 7/2017 | Wan | G06F 3/011 |
| 2018/0005642 | A1* | 1/2018 | Wang | G10L 21/0208 |
| 2018/0270517 | A1* | 9/2018 | Maillot | H04N 21/4307 |

OTHER PUBLICATIONS

International Search Report & Written Opinion dated Mar. 5, 2019 for International Patent Application No. PCT/US2019/0161137.

* cited by examiner

*Primary Examiner* — William A Jerez Lora

(74) *Attorney, Agent, or Firm* — JDI Patent; Joshua D. Isenberg; Robert A. Pullman

(57) ABSTRACT

A method for localization of sound in a speaker system comprises determining speaker locations of a plurality of speakers in a speaker system, determining a user location of a user within a room, and modifying audio signals to be transmitted to each of the plurality of speakers based on the user location in the room relative to a corresponding one of the speaker locations. An optimum modification of the audio signals for each of the plurality of speakers includes eliminating locational effects of the user location within the room.

18 Claims, 6 Drawing Sheets

LOCALIZATION OF SOUND IN A SPEAKER SYSTEM

FIELD OF THE INVENTION

The current disclosure relates to audio signal processing. More specifically the current disclosure relates audio signal modification based on detected speaker locations in a speaker system and the user location.

BACKGROUND OF THE INVENTION

Surround sound allows stereoscopic sound reproduction of an audio source with multiple audio channels from speakers that surround the listener. Surround sound systems are not only commonly installed in business facilities (e.g., movie theaters) but also popular for home entertainment use. The system usually includes a plurality of loudspeakers (such as five for a 5.1 speaker system or seven for a 7.1 speaker system) and one bass loudspeaker (i.e., subwoofer).

FIG. 1 illustrates a common setup of a 5.1 surround sound system 100 for use with an entertainment system 170 to provide a stereoscopic sound. The entertainment system 170 includes a display device (e.g., LED monitor or television), an entertainment console (e.g., game console, DVD player or setup/cable box) and peripheral devices (e.g., image capturing device or remote control 172 for controlling the entertainment console). The configuration for the surround sound system includes three front speakers (i.e., a left loudspeaker 110, a center loudspeaker 120, and a right loudspeaker 130), two surround speakers (i.e., a left surround loudspeaker 140 and a right surround loudspeaker 150), and a subwoofer 160. Each loudspeaker plays out a different audio signal so that the listener is presented with different sounds from different directions. Such a configuration of the surround sound system 100 is designed for a listener located at the center of the system (as the listener 190 as shown in FIG. 1) for optimal stereoscopic sound experiences. In other words, each individual loudspeaker in the system has to be installed (i.e., positioned and oriented) in a particular location or installed exactly by distance to the audience and among each other in order to provide the optimal sound. However, it is often very difficult to arrange the loudspeakers as required due to the layout or other circumstances of the installation room. Additionally, a listener may not always be in the center of the system. FIG. 2 illustrates an example of a listener 290 being off center of a 5.1 speaker system. The listener 290 in FIG. 2 would have a poorer listening experience than a listener in the center of the system.

It is within this context that aspects of the present disclosure arise.

BRIEF DESCRIPTION OF THE DRAWINGS

Aspects of the present disclosure can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

Because a user's experience of sound from a surround sound system depends on the location of use relative to the system's loudspeakers, there is a need in the art, for a way to determine relative locations of the loudspeakers of a speaker system to a user location and modify the audio signals from the speakers accordingly for the user to enjoy a high quality stereoscopic sound.

Determining Loudspeaker Locations Relative to User Location

According to aspects of the present disclosure, a method is provided for determining speaker locations in a speaker system relative to a user location and modifying audio signals accordingly. The method comprises determining speaker locations of a plurality of speakers in a speaker system, determining a user location within a room, and modifying audio signals to be transmitted to each of the plurality of speakers based on the user location in the room relative to a corresponding one of the speaker locations. An optimum modification of the audio signals for each of the plurality of speakers includes eliminating locational effects of the user location within the room.

Figure 1:
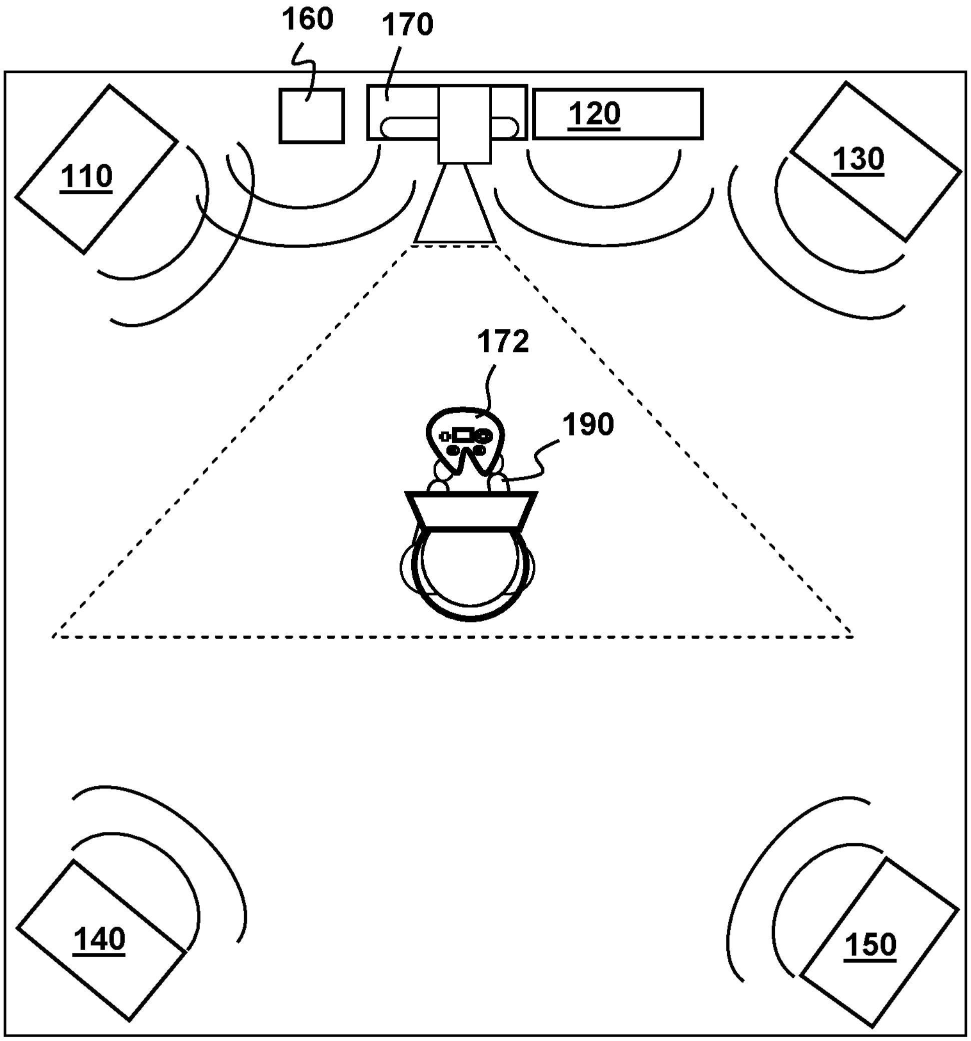
FIG. 1 is a schematic diagram illustrating an example of a user surrounding in a 5.1 speaker system.
Figure 2:
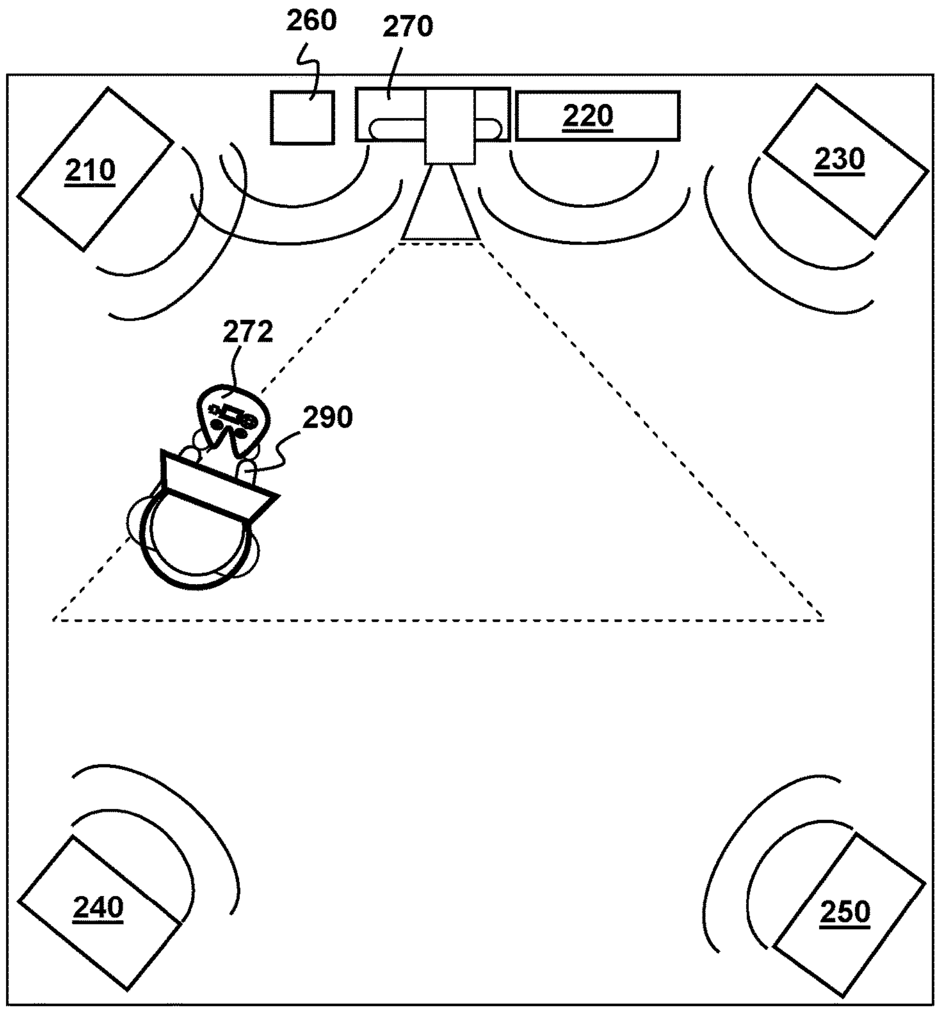
FIG. 2 is a schematic diagram illustrating an example of a user surrounding in a 5.1 speaker system.
Figure 3:
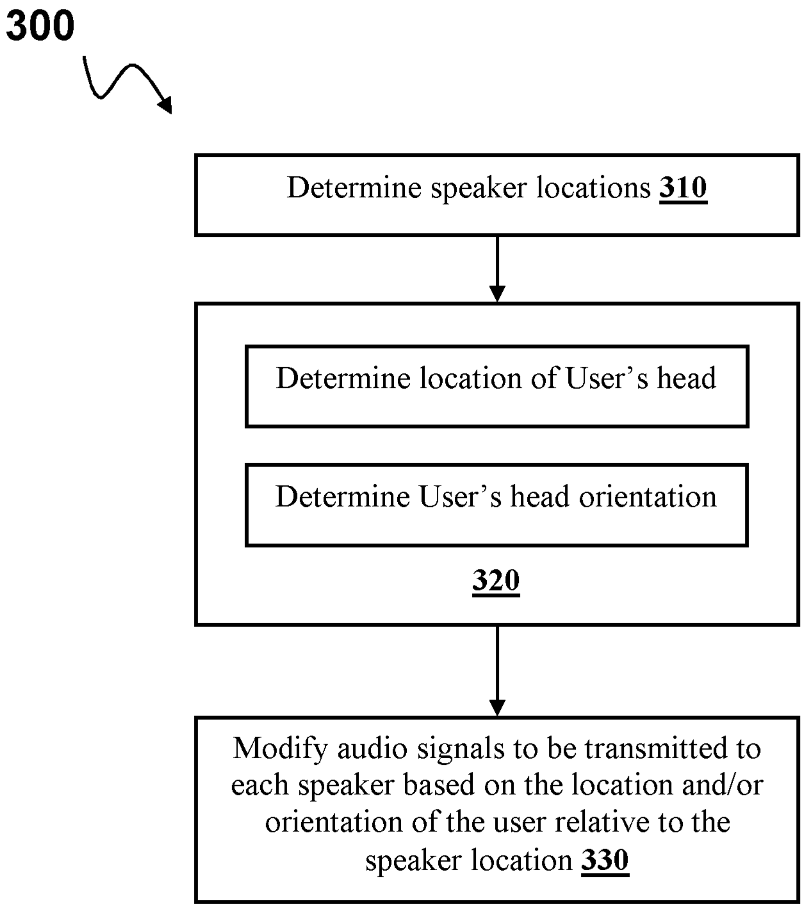
FIG. 3 is a flow diagram of a method for localization of sound in a speaker system according to aspects of the present disclosure.

FIG. 3 is a flow diagram of a method for localization of sound in a speaker system according to aspects of the present disclosure. According to aspects of the present disclosure, the method applies to a speaker system having speakers arranged in a standard formation as shown in FIG. 1 as well as a speaker system having speakers arranged in a non-standard formation. Each speaker is configured to receive audio for playout via wire or wireless communication.

As shown in FIG. 3, each speaker location of a plurality of speakers in the speaker system may be determined at 310. User location and orientation information are determined, as indicated at 320. Audio signals from the speakers may then be modified based on the relative locations of speakers and the user, as indicated at 330. In some implementations, determining the speaker locations may involve using at least two microphones to determine a distance between the microphones and each of the plurality of speakers from time delays in arrival of signals from the speakers at the different microphones. In other implementations, determining the speaker locations may involve obtaining an image of a room in which the speakers are located with an image capture unit and analyzing the image.

Figure 4:
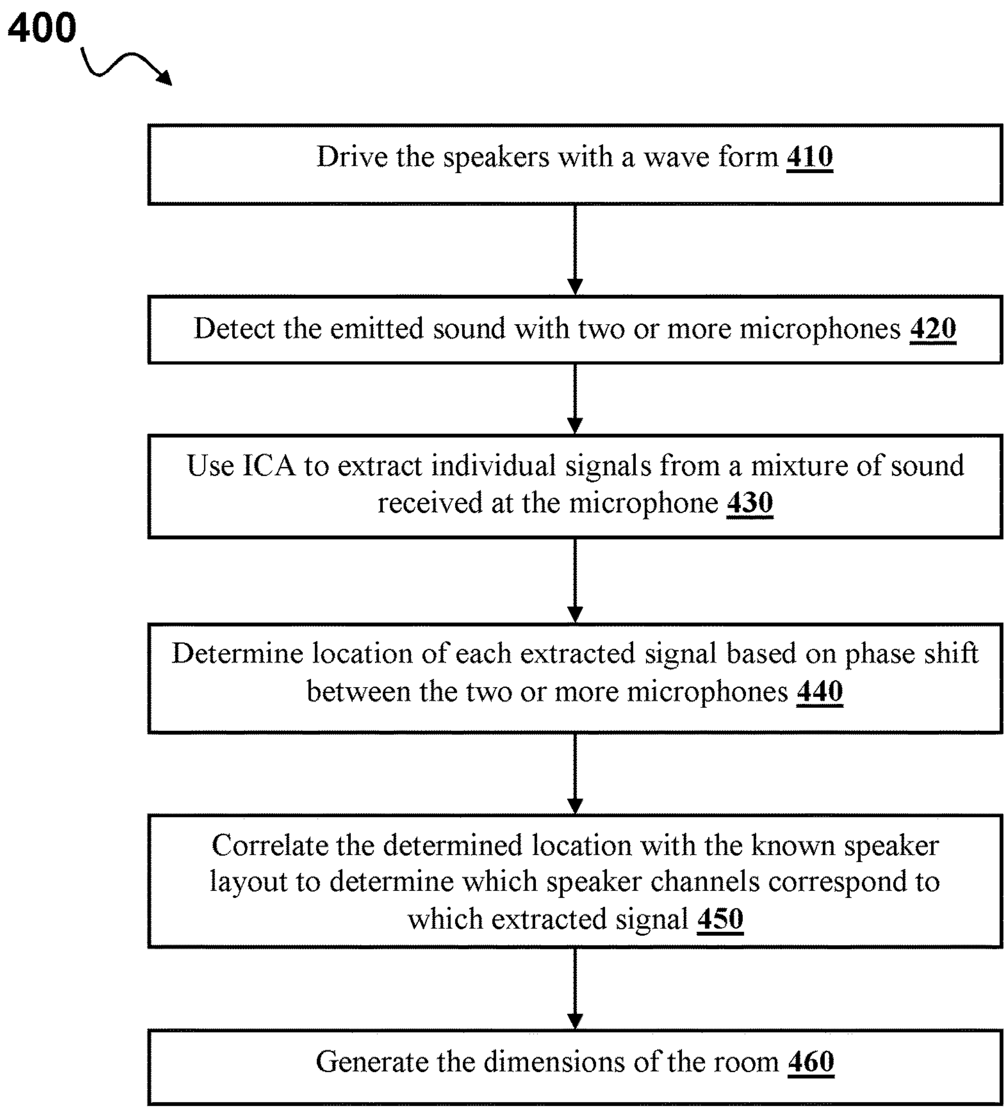
FIG. 4 is a flow diagram of a method for determining a speaker location according to an aspect of the present disclosure.

FIG. 4 shows the detailed flow diagram of an exemplary method for determining a speaker location using microphones according to an aspect of the present disclosure. In the illustrated example, each speaker is driven with a wave form, as indicated at 410. There are a number of different possible configurations for the waveform that drives the speakers. By way of example, and not by way of limitations, the wave form may be a sinusoidal signal having a frequency above the audible range of the user. By way of example, and not by way of limitation, the wave form may be produced by a wave form generator communicatively coupled to the speakers. Such a waveform generated may be part of a device, such as a game console, television system, or audio system. By way of example, and not by way of limitation, the user may initiate the waveform generation procedure by pressing a button on a game controller coupled to a game console that is coupled to the speaker system. In such an implementation, the game controller sends an initiating signal to the game console which in turn sends out an instruction to the speaker system to send a wave form to the speakers. As indicated at 420, a mixture of sounds emitted from the plurality of speakers is received by an array of microphones having two or more microphones. The microphones are in fixed positions relative to each other with adjacent microphones separated by a known geometry (e.g., a known distance and/or known layout of the microphones). In one embodiment, the array of microphones is provided in an object held by or attached to the user (e.g., a game controller or a remote controller held by the user or an earphone or virtual reality headset mounted on the user).

Each microphone may include a transducer that converts received sounds into corresponding electrical signals. The electrical signals may be analyzed in any of a number of different ways. By way of example, and not by way of limitation, electrical signals produced by each microphone may be converted from analog electrical signals to digital values to facilitate analysis by digital signal processing on a digital computer.

At 430, Independent Component Analysis (ICA) may be applied to extract signals from a mixture of sounds received at the microphones. Generally, ICA is an approach to the source separation problem that models the mixing process as linear mixtures of original source signals, and applies a de-mixing operation that attempts to reverse the mixing process to produce a set of estimated signals corresponding to the original source signals. Basic ICA assumes linear instantaneous mixtures of independent non-Gaussian source signals, with the number of mixtures equal to the number of source signals. Because the original source signals are assumed to be independent, ICA estimates the original source signals by using statistical methods extract a set of independent (or at least maximally independent) signals from the mixtures. In other words, the signals corresponding to sounds originating from the speakers in the speaker system can be separated or extracted from the microphone signals by ICA. Some examples of ICA are described in detail, e.g., in U.S. Pat. Nos. 9,099,096, 8,886,526, 8,880,395, and U.S. Patent Application Publication 2013/0294611, the entire contents of all four of which are incorporated herein by reference.

As indicated at 440, the location of the source of each extracted signal relative to the microphones may then be determined based on the differences in time of arrival of sounds corresponding to a given speaker at the microphones. Specifically, each extracted signal from a given speaker arrives at different microphones at different times. Differences in time of arrival at different microphones in the array can be used to derive information about the direction or location of the source. Conventional microphone direction detection techniques analyze the correlation between signals from different microphones to determine the direction to the location of the source. That is, the location of each extracted signal relative to the microphones can be calculated based on the difference in time of arrival between the signals received by the two or more microphones.

At 450, the calculated location of each extracted signal is correlated to a known layout of the speaker system to identify the speaker corresponding to a particular extracted signal. For example, it is known that, in a 5.1 speaker system as shown in FIG. 1, there is a front left speaker which is relatively to the front and left of the microphones (i.e., the user location), a center speaker which is to the front of the user location, a front right speaker which is relatively to the front and right of the user location, a rear left speaker which is relatively to the rear and left of the user location and a rear right speaker which is relatively to the rear and right of the user location. Such a known speaker configuration can correlate to the calculated locations of the extracted signals from step 440 to determine which speaker channels correspond to which extracted signal. That is, the location of each of the speakers relative to the microphones (i.e., the user location) can be determined.

In some implementations, in might be desirable to determine the dimensions of the room in which the speakers are located so that this information can be used to compensate for the effects of sound from different speakers reverberating from the walls and/or floor and/or ceiling of the room. Although there are many ways to determine this information it is possible to determine this information through further analysis of sounds from the speakers that are captured by the microphones once the distance of microphones from each speaker is determined, as indicated at 460. By way of example, the isolated signals corresponding to sounds originating from a given speaker, e.g., as determined from ICA, may be analyzed to detect differences in time of arrival at different microphones due to sounds travelling directly from the speaker to the microphones and sounds from the speaker that reflect off the walls, floor, or ceiling. The time delays can be converted to differences in distance using the previously determined relative locations of the speakers with respect to the microphones. The differences in distance may be analyzed to determine the relative locations of the walls, ceiling, and floor.

Referring back to FIG. 3, the method according to aspects of the present disclosure also includes determining a user location of a user in the room at step 320. The step for detecting the user location can be performed prior to or after the step of determining the speaker locations discussed in connection with FIG. 4. It should be noted that the user location within the room comprises a position and/or an orientation of the user's head. The user location can be detected or tracked using one or more inertial sensors mounted upon the user or upon an object (such as a game controller or remote controller) attached to the user. In one embodiment, a game controller held by the user includes one or more inertial sensors which may provide position and/or orientation information via an inertial signal. Orientation information may include angular information such as a tilt, roll or yaw of the game controller, thereby the orientation of the user. By way of example, the inertial sensors may include any number and/or combination of accelerometers, gyroscopes or tilt sensors. In another embodiment, the user location can be tracked using an image capture unit (e.g., a camera) for detecting locations of one or more light sources.

After determining the speaker locations and the user location, the audio signals to be transmitted to each of the plurality of speakers for playout can be modified accordingly at step 330. Based upon the determined user location (i.e., the location of user's head and/or the orientation of user's head) relative to a particular speaker location, a corresponding signal to be transmitted to that speaker can be modified by delaying it to change its signal delay time or by adjusting its signal amplitude to equalize the sound channels. In one embodiment, the modification step includes modifying the audio signals to eliminate location sound effects (e.g., echo effect) based on the information of the user location and the room dimensions to eliminate echo or location-dependent sound effects. A method according to the aspects of the present disclosure provides a user to enjoy high quality stereoscopic sounds even when the speakers in the speaker system are not installed exactly as required and/or the user is not situated in the center of the speaker system.

Figure 5:
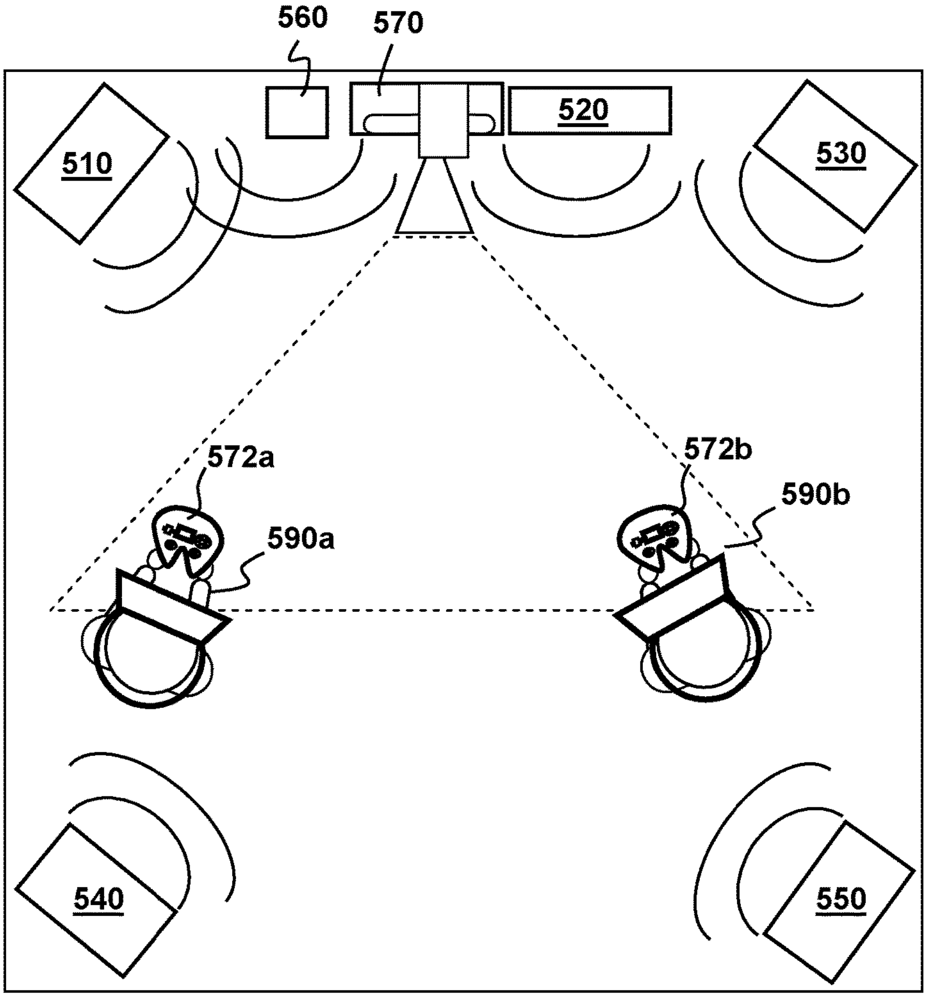
FIG. 5 is a schematic diagram illustrating an example of two users surrounding in a speaker system according to aspects of the present disclosure.

It should be noted that upon detection of a second user in the room as shown in FIG. 5, the modifications made at step 330 are eliminated. In one embodiment, detecting a second user includes detecting a signal from a second controller.

Figure 6:
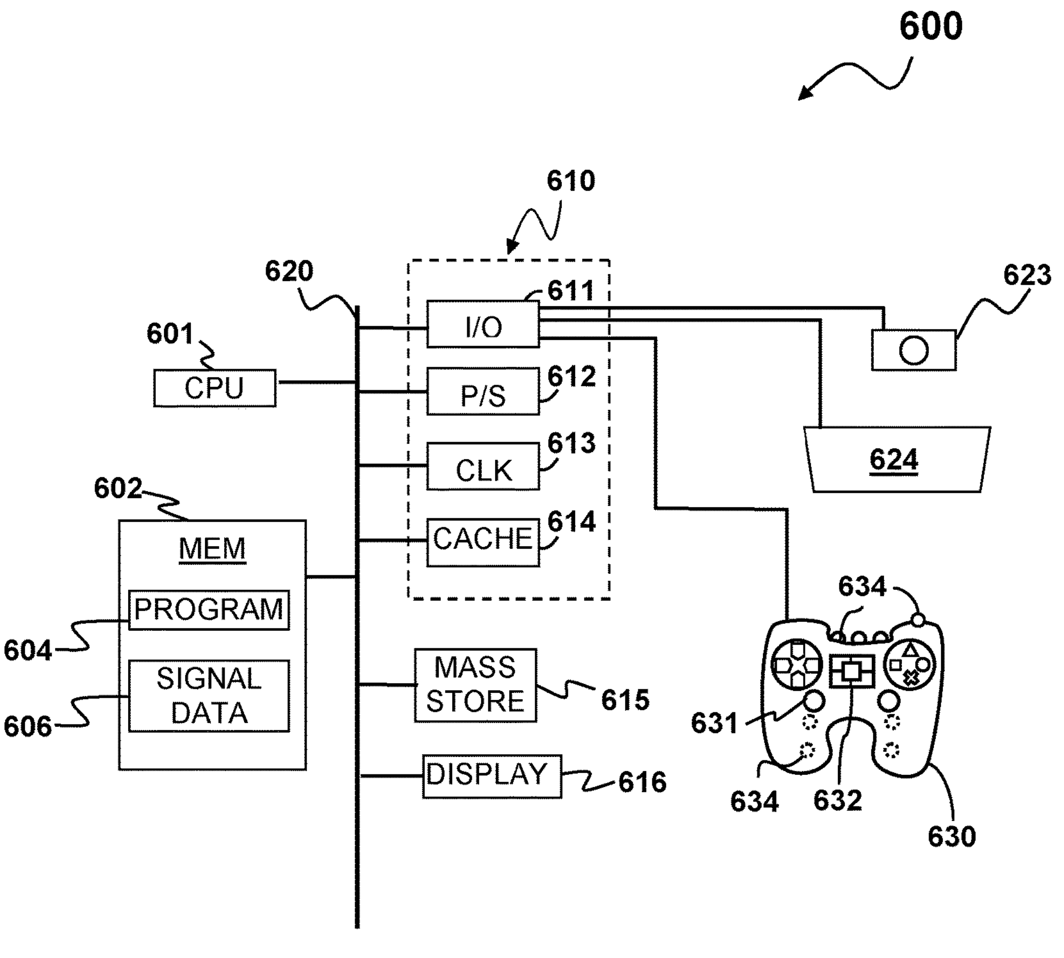
FIG. 6 is a block diagram illustrating a signal processing apparatus according to aspects of the present disclosure.

According to aspects of the present disclosure, a signal processing method of the type described above with respect to FIGS. 3 and 4 operating as described above may be implemented as part of a signal processing apparatus 600, as depicted in FIG. 6. The apparatus 600 may be incorporated in an entertainment system, such as a TV, video game console, DVD player or setup/cable box. The apparatus 600 may include a processor 601 and a memory 602 (e.g., RAM, DRAM, ROM, and the like). In addition, the signal processing apparatus 600 may have multiple processors 601 if parallel processing is to be implemented. The memory 602 includes data and code instructions configured as described above.

The apparatus 600 may also include well-known support functions 610, such as input/output (I/O) elements 611, power supplies (P/S) 612, a clock (CLK) 613 and cache 614. The apparatus 600 may optionally include a mass storage device 615 such as a disk drive, CD-ROM drive, tape drive, or the like to store programs and/or data. The controller may also optionally include a display unit 616. The display unit 616 may be in the form of a cathode ray tube (CRT) or flat panel screen that displays text, numerals, graphical symbols or images. The processor 601, memory 602 and other components of the system 600 may exchange signals (e.g., code instructions and data) with each other via a system bus 620 as shown in FIG. 6.

As used herein, the term I/O generally refers to any program, operation or device that transfers data to or from the system 600 and to or from a peripheral device. Every data transfer may be regarded as an output from one device and an input into another. Peripheral devices include input-only devices, such as keyboards and mouses, output-only devices, such as printers as well as devices such as a writable CD-ROM that can act as both an input and an output device. The term "peripheral device" includes external devices, such as a mouse, keyboard, printer, monitor, speaker, microphone, game controller, camera, external Zip drive or scanner as well as internal devices, such as a CD-ROM drive, CD-R drive or internal modem or other peripheral such as a flash memory reader/writer, hard drive.

According to aspects of the present disclosure, an optional image capture unit 623 (e.g., a digital camera) may be coupled to the apparatus 600 through the I/O functions 611. Additionally, a plurality of speakers 624 may be coupled to the apparatus 600, e.g., through the I/O function 611. In some implementations, the plurality of speakers may be a set of surround sound speakers, which may be configured, e.g., as described above with respect to FIG. 1.

In certain aspects of the present disclosure, the apparatus 600 may be a video game unit. Video games or title may be implemented as processor readable data and/or instructions which may be stored in the memory 602 or other processor readable medium such as one associated with the mass storage device 615. The video game unit may include a game controller 630 coupled to the processor via the I/O functions 611 either through wires (e.g., a USB cable) or wirelessly. Specifically, the game controller 630 may include a communications interface operable to conduct digital communications with at least one of the processor 602, a game controller 630 or both. The communications interface may include a universal asynchronous receiver transmitter ("UART"). The UART may be operable to receive a control signal for controlling an operation of a tracking device, or for transmitting a signal from the tracking device for communication with another device. Alternatively, the communications interface includes a universal serial bus ("USB") controller. The USB controller may be operable to receive a control signal for controlling an operation of the tracking device, or for transmitting a signal from the tracking device for communication with another device. In some embodiments, a user holds the game controller 630 during the play. In some embodiments, the game controller 630 may be mountable to a user's body. According to the some aspects of the present disclosure, the game controller 630 may include a microphone array of two or more microphones 631 for determining speaker locations. In addition, the game controller 630 may include one or more inertial sensors 632, which may provide position and/or orientation information to the processor 601 via an inertial signal. In addition, the game controller 630 may include one or more light sources 634, such as light emitting diodes (LEDs). The light sources 634 may be used to distinguish one controller from the other. For example one or more LEDs can accomplish this by flashing or holding an LED pattern code. Furthermore, the LED pattern codes may also be used to determine the positioning of the game controller 630 during game play. For instance, the LEDs can assist in identifying tilt, yaw and roll of the controllers. The image capture unit 623 may capture images containing the game controller 630 and light sources 634. Analysis of such images can determine the location and/or orientation of the game controller, thereby the user. Such analysis may be implemented by program code instructions 604 stored in the memory 602 and executed by the processor 601.

The processor 601 may use the inertial signals from the inertial sensor 632 in conjunction with optical signals from light sources 634 detected by the image capture unit 623 and/or sound source location and characterization information from acoustic signals detected by the microphone array 631 to deduce information on the location and/or orientation of the game controller 630 and/or its user.

The processor 601 may perform digital signal processing on signal data 606 in response to the data 606 and program code instructions of a program 604 stored and retrieved by the memory 602 and executed by the processor module 601. Code portions of the program 604 may conform to any one of a number of different programming languages such as Assembly, C++, JAVA or a number of other languages. The processor module 601 forms a general-purpose computer that becomes a specific purpose computer when executing programs such as the program code 604. Although the program code 604 is described herein as being implemented in software and executed upon a general purpose computer, those skilled in the art will realize that the method of task management could alternatively be implemented using hardware such as an application specific integrated circuit (ASIC) or other hardware circuitry. As such, it should be understood that embodiments of the invention can be implemented, in whole or in part, in software, hardware or some combination of both.

The program code may include one or more instructions which, when executed, cause the apparatus 600 to perform the method 300 of FIG. 3 and/or method 400 of FIG. 4. Such instructions may cause the apparatus at least to determine speaker locations of a plurality of speakers in a speaker system, determine a user location of a user within a room, and modify audio signals to be transmitted to each of the plurality of speakers based on the user location in the room relative to a corresponding one of the speaker locations. The program code 604 may also include one or more instructions on an optimum modification of the audio signals for each of the plurality of speakers to include eliminating locational effects of the user location within the room.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for localization of sound in a speaker system, the method comprising:

a) determining speaker locations of a plurality of speakers in a speaker system wherein determining speaker locations comprises:
   - using at least two microphones to determine a distance between the at least two microphones and each of the plurality of speakers;
   - using Independent Component Analysis to determine original signals from a mixture of sounds received at the at least two microphones and calculating a location of each original signal relative to the at least two microphones; and
   - correlating the calculated location of each original signal to a known speaker channel configuration;

b) determining a user location of a user within a room; and c) modifying audio signals to be transmitted by each of the plurality of speakers based on the user location in the room relative to a corresponding one of the speaker locations, wherein modifying the audio signals to be transmitted by each of the plurality of speakers includes eliminating locational effects of the user location within the room.

2. The method of claim 1, wherein the user location within the room comprises a position and/or an orientation of the user's head.

3. The method of claim 1, wherein determining the user location includes using at least one accelerometer and/or gyroscopic sensor mounted upon the user.

4. The method of claim 1, wherein determining the user location includes using at least one accelerometer and/or gyroscopic sensor coupled to an object attached to the user.

5. The method of claim 1, further comprising detecting a second user and eliminating the modifications made in c) in response to the detection of the second user.

6. The method of claim 5, wherein detecting a second user includes detecting a signal from a second controller.

7. The method of claim 1, wherein determining the user location includes using an image capture unit to detect locations of one or more light sources.

8. The method of claim 1, wherein determining the speaker locations includes obtaining an image of a room containing the speakers with an image capture unit and analyzing the image.

9. The method of claim 1, wherein modifying audio signals to be transmitted to each of the plurality of speakers includes changing signal delay time and/or signal amplitude of the audio signals to be transmitted.

10. A non-transitory computer-readable medium with instructions embedded thereon, wherein the instructions when executed cause a processor to carry out a method for localization of sound in a speaker system, comprising:

a) determining speaker locations of a plurality of speakers in a speaker system wherein determining speaker locations comprises:
   - using at least two microphones to determine a distance between the at least two microphones and each of the plurality of speakers;
   - using Independent Component Analysis to determine original signals from a mixture of sounds received at the at least two microphones and calculating a location of each original signal relative to the at least two microphones; and
   - correlating the calculated location of each original signal to a known speaker channel configuration;

b) determining a user location of a user within a room; and c) modifying audio signals to be transmitted by each of the plurality of speakers based on the user location in the room relative to a corresponding one of the speaker locations, wherein modifying the audio signals to be transmitted by each of the plurality of speakers includes eliminating locational effects of the user location within the room.

11. The method of claim 10, wherein the user location comprises a position and/or an orientation of the user's head.

12. The method of claim 10, wherein determining the user location includes using at least one accelerometer and/or gyroscopic sensor mounted upon the user.

13. The method of claim 10, wherein determining the user location includes using at least one accelerometer and/or gyroscopic sensor coupled to an object attached to the user.

14. The method of claim 10, further comprising detecting a second user and eliminating the modifications made in c) in response to the detection of the second user.

15. The method of claim 14, wherein detecting a second user includes detecting a signal from a second controller.

16. The method of claim 10, wherein determining the user location includes using an image capture unit to detect locations of one or more light sources.

17. The method of claim 10, wherein determine the speaker locations include projection of a reference image into the room and detection of the reference image with an image capture unit.

18. The method of claim 10, wherein modifying audio signals to be transmitted to each of the plurality of speakers includes changing signal delay time and/or signal amplitude of the audio signals to be transmitted.

* * * * *